Jan. 13, 1959   H. M. FOX   2,868,127
ROCKET MOTOR
Filed June 5, 1953
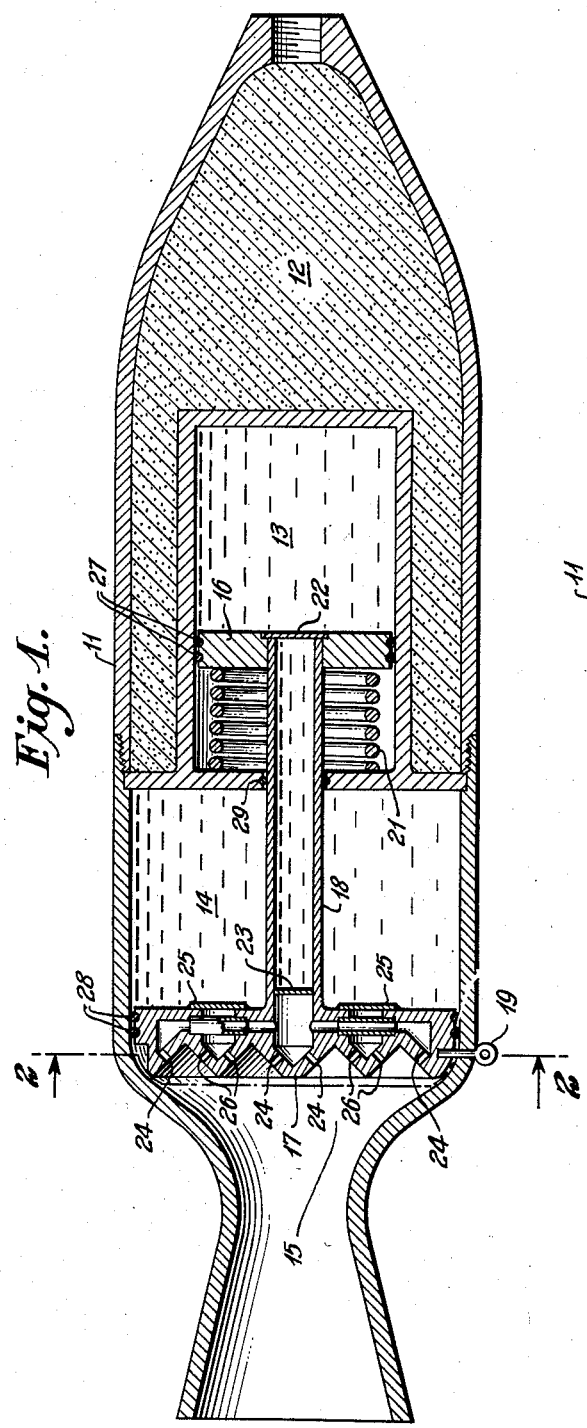
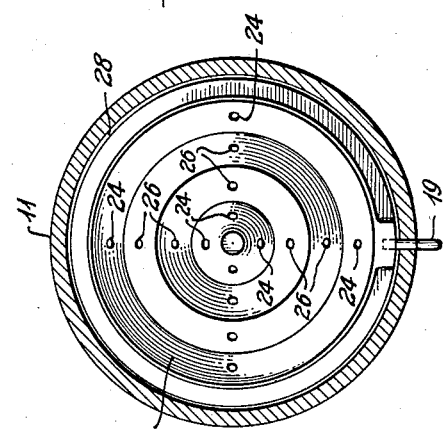
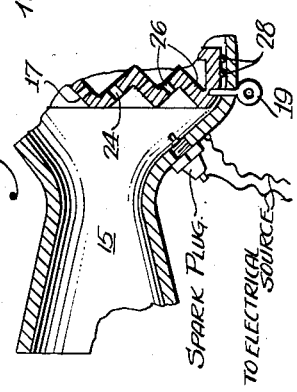
INVENTOR.
H. M. Fox
BY Hudson and Young
ATTORNEYS

# United States Patent Office 2,868,127
Patented Jan. 13, 1959

2,868,127

ROCKET MOTOR

Homer M. Fox, Bartlesville, Okla., assignor to Phillips Petroleum Company, a corporation of Delaware Application June 5, 1953, Serial No. 359,931

4 Claims. (Cl. 102—49)

This invention relates to rocket motors employing liquid propellents. In one aspect this invention relates to a simple and automatically controlled liquid propellent feed system for rocket motors. In another aspect it relates to a rocket motor wherein the combustion chamber is continuously enlarged during the operation period of the motor.

Liquid fuels have many advantages over solid fuels for the propulsion of rockets, although solids are usually used in ordnance missiles, and other applications where thrust control is not required, because of their simplicity. A few large ordnance missiles have been designed and built which utilize liquid propellents. These liquid propellent ordnance missiles, however, are complicated and have not been applicable to small ordnance missiles. These liquid rocket propulsion systems have a complex feed mechanism which may have some 20 or more very sensitive precision valves and switches. There is indeed a great need for the simplification of liquid propellent feed systems for use in rocket motors.

Each of the following objects will be attained by at least one of the aspects of this invention.

It is an object of this invention to provide a simple and automatically controlled liquid propellent feed system for rocket motors.

It is another object to provide a liquid propellent feed system whereby ignition is obtained automatically.

It is another object to provide a liquid rocket propellent system wherein the volume of the combustion chamber is increased as combustion progresses.

It is still another object to provide a liquid propellent feed system for rocket motors wherein the rate of feed of the oxidizer and fuel to the combustion chamber is automatically controlled throughout the period of combustion.

It is still another object to provide a rocket propellent feed system wherein a hypergolic fuel is initially used in the presence of an oxidizer to initiate combustion.

Other objects and advantages will be apparent to one skilled in the art upon reading this disclosure which includes the attached drawing wherein:

Figure 1 is a schematic view in cross section of a rocket motor wherein the feed system of this invention is employed and Figure 2 is a view taken along the line 2—2 of Figure 1.

Figure 3 is a schematic view in cross-section of a modification of the combustion chamber of Figure 1.

I have invented a simple and automatically controlled liquid propellent feed system for rocket motors. This system can be adapted to be used in small ordnance missiles as well as in large ordnance missiles. This system, shown in the accompanying drawing, comprises tanks of fuel and oxidizer with the necessary passages and injectors to provide fuel and oxidizer to the combustion chamber of the rocket motor. A hypergolic fuel can be contained in the piston shaft and used for starting the rocket motor. The propellent tanks are made into cylinders. The pistons are actuated by combustion chamber gas and a compression spring and force the fuel and oxidizer out of the tanks under pressure by mechanically combining the pistons in the oxidizer and fuel tanks into a piston assembly unit. It is possible to predetermine the operating mixture ratio very accurately making any mixture ratio controls, such as restricting orifices, unnecessary.

Both fuel and oxidizer nozzles are integral parts of the oxidizer piston. The fuel communicates with its nozzles through the hollow shaft connecting the oxidizer and fuel pistons. Prior to firing, the piston assembly is held in position against the force of a compression spring by means of a pin or other suitable device. The piston shaft is filled with a hypergolic fuel and is seperated from the main fuel which can be, for example, JP-3 (a jet fuel) or gasoline, by means of a pressure disk at the fuel end of the piston shaft. The term JP-3 is a military designation for a jet fuel further identified as (AN-F-58) MIL-F-5624 and such fuel is characterized by an A. P. I. gravity at 60° F. of 45 to 63, a minimum 90 percent distillation temperature of 400° F. and a maximum end point of 600° F. Such fuel is further described in Aircraft Gas-Turbine Fuels by H. A. Murray beginning at page 218 of the Oil and Gas Journal of March 29, 1951. When the pin is pulled, contact of the hypergolic fuel and oxidizer in the combustion chamber initiates combustion and combustion is maintained by the main fuel as it displaces the hypergolic fuel.

The volume required to compress the spring can be justified because combustion chamber volume can be made quite small at the beginning, increasing as combustion continues. The combustion chamber pressure operates against the oxidizer piston. A connecting line from the atmosphere or the combustion chamber to the space wherein the spring is contained (not shown in drawing) may be desirable to equalize the pressure. The connecting line can be located in the piston shaft or it can be located external to the missile as desired. The spring needs be only strong enough to overcome friction of the pistons and pressure drop across the fuel and oxidizer nozzles. Thus the spring and the combustion chamber pressure combine to operate the piston assembly. No complex igniting device is required since starting is accomplished by a starting slug of hypergolic fuel. This missile permits the use of fuels like jet fuel, gasoline, or ammonia. The space around the fuel tank is used for the missile explosive. The purpose of this configuration is to enable liquids to compete with solid propellants for artillery rockets and other short-burning time rockets. The loading of the propellant is very good because the combustion chamber is almost negligible at the start.

Advantages of this system over previous gas pressurizing systems which have been used include: (1) this system can be adapted to both small and large missiles; (2) control of flow at ignition can be accomplished by a simple mechanical system; (3) combustion instability generated from the oscillations of fuel column between two gases (fuel and oxidizer) is eliminated; and (4) flight stability is increased since liquid surface effects are eliminated. The advantages of liquid propellants over solids include: (1) liquid propellants have high specific impulse; and (2) cheapness of liquid propellants as compared to solid propellants where the oxidizer and fuel must be fabricated into one solid grain. While this embodiment has been described in terms of an ordnance missile, it is evident that it may be adapted to a wide variety of pay loads other than explosives.

Reference is now made to Figure 1 which illustrates a rocket having a shell 11, explosive chamber 12, fuel tank 13, oxidizer tank 14, and a combustion chamber 15. A piston assembly comprising a piston 16 situated in fuel tank 13, and a piston 17 situated in combustion chamber 15, so as to form one wall over said combustion chamber, is formed by a hollow shaft 18 connecting pistons 16 and 17. The piston assembly is secured against the pressure of spring 21 by starting pin 19. Pressure disk 22 separates fuel in fuel tank 13 from the hypergolic fuel confined in hollow shaft 18 and pressure disk 23 confines the hypergolic fuel and seals it from nozzles 24 in piston 17. Pressure disks 25 similarly seal the oxidizer in tank 14 from nozzles 26 in piston 17.

Piston 16 maintains sealing contact with the walls of fuel tank 13 by means of O rings 27, piston 17 maintains sealing contact with the walls of oxidizer tank 14 by means of O rings 28 and hollow shaft 18 maintains sealing contact with the edges of the opening in the forward wall of oxidizer tank 14 by means of O rings 29.

The operation of the rocket motor is as follows: when the starter pin 19 is pulled, the energy of compressed spring 21 is released and pressure disks 22, 23 and 25 are simultaneously burst by the pressure exerted upon the fluids in fuel tank 13 and oxidizer tank 14. Oxidizer fluid flows through the nozzles 26 and hypergolic fuel flows through nozzles 24. Spontaneous combustion results from contact of the hypergolic fuel with the oxidizer and the ensuing expansion of gases develops pressure upon piston 17, thus forcing fuel through nozzles 24, after the hypergolic fuel supply is exhausted, and oxidizer through nozzles 26. The movement of the piston assembly by the combined pressure of the combustion gases and spring 21 continues to supply fuel and oxidizer to the combustion chamber and to continuously enlarge the combustion chamber until the fuel and oxidizer tanks are empty.

The volume of the combustion chamber is usually a compromise between the volume required for complete combustion and the loading considerations. In designing a rocket motor, some combustion efficiency is sacrificed in order to lower the rocket weight. The fluid propellant feed system of this invention provides a simple and satisfactory solution to the problem of such compromise. According to the method of this invention, the combustion chamber is quite small at the time of the initiation of combustion, and combustion efficiency is poor. However, as combustion proceeds, the volume increases and, as a result, the combustion efficiency increases. After a short interval of time, the combustion chamber volume is sufficient for substantially complete combustion, and the combustion efficiency is high. Therefore, the constantly increasing volume of the combustion chamber results in better loading and higher combustion efficiency over most of the burning time because the increase in combustion chamber volume is obtained by utilizing space provided by consuming liquid propellant.

Combustion efficiency is a function of, among other things such as fuel and operating conditions, the fundamental vibration characteristics and, therefore, the dimensions of the combustion chamber. Thus constantly increasing combustion chamber volume results in more stable combustion because fundamental vibrations are dampened by a changing combustion chamber volume. It is within the scope of this invention to employ a spring having a constant completely out of the range of aerodynamic and accoustic frequencies so that the spring itself will dampen motor vibrations.

The incorporation of a slug of hypergolic fuel to be mixed with the oxidizer at the beginning of the period of operation of the motor simplifies the starting of the motor and makes an auxiliary ignition system unnecessary.

Although I prefer to use a hypergolic fuel with the oxidizer to initiate combustion, the method and apparatus of this invention can also be employed in rocket motors wherein other means are employed for igniting the propellants. Thus, ignition can be obtained by a spark plug, a powder charge, a catalyst or other means.

Figure 3 illustrates a modification of the invention wherein a spark plug is positioned in the combustion chamber so as to ignite the charge admitted to the combustion chamber.

The oxidizer can be any known liquid oxidizing agent, for example RFNA (red fuming nitric acid) and the hypergolic fuel can be any liquid material which combusts spontaneously upon contact with an oxidizer such as RFNA, e. g., aniline. The main fuel as hereinbefore stated can be any suitable hydrocarbon fuel such as gasoline.

Reasonable variations and modifications are possible within the scope of the disclosure of this invention, the essence of which is a liquid rocket propellent feed system wherein the propellent tanks are cylinder and the propellant is forced out of the tanks into the combustion chamber by the pressure of combustion, aided by the pressure of a compressed spring, exerted upon the piston so that the combustion chamber is continuously enlarged at the expense of the volume of the propellent tanks.

I claim:

1. A rocket comprising a shell member containing an explosive charge; a fuel tank; an oxidizer tank; a combustion chamber; a piston assembly, said piston assembly comprising a piston head disposed within said fuel tank so as to form a movable wall thereof, a piston head disposed within said oxidizer tank so as to form a movable wall of said tank and said combustion chamber, and a hollow shaft connecting said piston heads, the interior of said hollow shaft communicating with said fuel tank, said piston head forming said movable wall of said oxidizer tank and said combustion chamber having nozzle openings therein communicating with said oxidizer tank and said combustion chamber and having nozzle openings communicating between the interior of said hollow shaft and said combustion chamber; pressure sensitive sealing means disposed within said hollow shaft and adapted so as to seal a hypergolic fuel within said hollow shaft; pressure sensitive sealing means sealing said nozzle openings communicating between said oxidizer tank and said combustion chamber; and a resilient member adapted to move said piston assembly into said oxidizer tank and into said fuel tank when released by a starting means, said resilient means having sufficient power to rupture said pressure sensitive sealing means.

2. A rocket motor comprising a plurality of liquid propellent containers; pistons disposed in said containers so as to force propellant from said containers, said pistons being connected so as to act as a unit; a combustion zone wherein at least one of said pistons forms a moveable wall thereof; nozzles communicating between said containers and said combustion zone adapted to introduce said liquid propellants into said combustion zone; resilient means adapted to move said pistons into said containers; and means to ignite said propellants upon introduction into said combustion zone.

3. In a rocket motor wherein a bipropellant is expanded in a combustion chamber and expelled through an exhaust nozzle the improved feed system which comprises a first liquid propellent storage means having a movable wall; a second liquid propellent storage means having a movable wall, one of said walls also comprising a wall of said combustion chamber; means operatively connecting the movable walls of said first and second storage means; nozzle means connecting said combustion chamber and said storage means; means for moving said walls of said storage means; and means for igniting said propellents in said combustion chamber.

4. In a rocket motor where a liquid fuel and a liquid oxidizer are ignited and the combustion products are expelled through an exhaust nozzle, the improved feed system which comprises a liquid fuel container; a liquid oxidizer container; a piston disposed in each of said containers and forming a movable wall thereof, said pistons being connected so as to act as a unit, and one of said pistons forming a movable wall of said combustion chamber; means communicating between said containers and said combustion chamber to introduce fuel and oxidizer into said combustion chamber; a compression spring operatively connected to said pistons to force said pistons into said containers; means to hold said spring under compression; means to release said spring; and means to ignite said fuel and oxidizer upon introduction into said combustion chamber.

References Cited in the file of this patent

UNITED STATES PATENTS

| | | |
|---|---|---|
| 2,505,798 | Skinner | May 2, 1950 |
| 2,520,751 | Zucrow | Aug. 29, 1950 |
| 2,700,337 | Cumming | Jan. 25, 1955 |
| 2,753,801 | Cumming | July 10, 1956 |

FOREIGN PATENTS

| | | |
|---|---|---|
| 625,104 | France | Apr. 19, 1927 |
| 272,168 | Switzerland | Feb. 16, 1951 |